Patented Sept. 20, 1949

2,482,141

UNITED STATES PATENT OFFICE 2,482,141

HEAVY GRAVITY LIQUID SEPARATION OF COTTON SEED

Charlotte H. Boatner, Catherine M. Hall, and Arthur L. Merrifield, New Orleans, La., assignors to the United States of America as represented by the Secretary of Agriculture No Drawing. Application June 7, 1946, Serial No. 675,118

5 Claims. (Cl. 241—9)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to us of any royalty thereon.

This invention relates to cottonseed, and has among its objects an efficient process of separating cottonseed pigments from the other ingredients such as the meal and oil.

Cottonseed meal is a by-product of the cotton and cottonseed oil industry, and as such has been available in large quantities for many years. Its ready availability, as well as its high protein content, assure its potential value both as a livestock feed and as a source of protein for industrial use in the preparation of plastics, adhesives, sizes, fibers and the like. However, the use of cottonseed meal as a source of protein for industrial use has heretofore been limited because of its dark pigmentation which cannot be sufficiently reduced by the ordinary processing methods.

According to prior art processes, cottonseed has generally been mechanically processed for the production of oil and meal by either the so-called hydraulic-press method, or the continuous screw-press or expeller method. In the practice of the hydraulic-press method, dehulled cottonseed meats are rolled into thin flakes and cooked for 40 to 90 minutes at temperatures of from 225° to 240° F. to provide easier flow of oil in the subsequent pressing. Water is added to the flakes during the cooking if the moisture content of the flakes is below optimum. The meats are then preformed with light pressure into cakes, wrapped in haircloth, and stacked in a hydraulic press, a pressure of 1,000 to 1,600 lbs. per square inch being applied to the cakes for the removal of the oil. When the continuous screw-press or expeller method is used, the flaked meats are usually pre-cooked with or without added moisture, as described above, and then pressed by the action of a worm shaft continuously rotating within a pressing cylinder or cage composed of closely spaced bars which permit the oil to separate from the meal.

Besides softening and breaking down the cell walls to permit easier oil flow, the process of cooking in either of the above-mentioned methods also partially "fixes" or insolubilizes the cottonseed pigments, partially detoxifies the cottonseed, and at the same time, partially denatures the cottonseed protein. As a result of the fixation of the pigments during cooking, most of the pigments remain in the meal. Its color is darker than that of the original ground seed, and proteins isolated from it are so darkly colored as to be of very limited industrial application.

Considerable effort has been made to adopt the more economical and efficient solvent extraction process for the extraction of cottonseed oil. However, with solvent extraction, the control of the color presents an even greater problem than that involved in the hydraulic and continuous screw-press methods. With the use of some solvents, the oil produced by solvent extraction can be refined with a low refining loss and good color, but the residual meal contains most of the pigments and is deeply colored. With the use of other solvents, the residual meal is lightly colored, but the recovered oil contains excessive amounts of pigments, and is refined only with a high refining loss and poor color. For example, hydrocarbon solvents, such as petroleum naphthas, are satisfactory for the extraction of a light-colored oil but leave the pigments in the meal. This defatted meal is toxic to certain species of animals and resists the detoxifying action of cooking. Proteins prepared from such meals are deeply colored. On the other hand, exhaustive extraction with diethyl ether or chlorinated hydrocarbon solvents produces a meal which is practically free of pigments and is of satisfactory nutritive value, but at the same time the deeply colored cottonseed pigments are extracted with the oil and are removed from it during subsequent refining operations only with great difficulty. If the flakes are cooked prior to solvent extraction, oil and meal products similar to those obtained by the hydraulic press and expeller methods are obtained.

The unusual distribution of the pigments within the cottonseed kernel probably accounts for the fact that they are only partially removed with the oil extracted by solvent extraction of the seed, even when solvents are used in which the pigments are known to be highly soluble. The cottonseed pigments are found to be concentrated principally in small obloid corpuscles or pigment glands, which have been variously designated as "secretion cavities," "black glands," "gland dots," "resin glands," "oil glands," "gossypol glands," or simply "pigment dots." These obloid corpuscles or pigment glands are embedded in the tissue of all parts of the seed embryo.

It appears that the pigment glands are enclosed in membranes, and that they resist the action of most solvents as well as the rupturing action of the rolling and pressing operations used in the processing of cottonseed. Consequently, the pigments are protected from the solvent action of the extraction solvents or of the inherent cottonseed oil. We have discovered that the pigment glands of cottonseed are not ruptured by contact with certain organic solvents, particularly mineral oils for example, petroleum naphthas, such as petroleum ether, Skellysolve B (essentially normal hexane), Skellysolve D (essentially mixed heptanes), Skellysolve H (light naphtha), and Skellysolve L, certain other organic liquids, for example, carbon tetrachloride, and oils like fatty triglyceride, such as cottonseed oil, or mixtures of them; that the majority of the pigment glands are intact, even in ground or flaked cottonseed which has been defatted by exhaustive extraction with aliphatic hydrocarbons such as Skellysolve F or Skellysolve B; and that the pigment glands, the embryo tissue, and the hulls differ markedly in relative densities.

On the basis of these characteristics, the present invention provides a process of mechanical separation of substantially intact pigment glands from cottonseed products containing them, or separating the products into pigment glands, embryo tissue and hull tissue.

In general, according to the invention, a cottonseed product containing substantially intact pigment glands embedded in the seed embryo tissue (for example, cottonseed meal which has been defatted by a process which leaves the pigment glands intact in the meal, such as a solvent extraction using petroleum naphthas of the kind mentioned above which do not rupture the glands by contact), is treated to disintegrate the embryo tissue and release the intact pigment glands therefrom and is mixed with organic liquids or mixtures thereof which do not substantially attack the pigment gland membranes or rupture the glands, and which has a density between the densities of the parts of the seed products being separated, in particular, said liquid being a mixture of carbon tetrachloride and an oil, selected from the class consisting of fatty acid triglycerides and mineral oils. By this treatment, the pigment glands will be floated while the other parts will precipitate and settle, so that the floating glands can be separated from the precipitated parts.

In more detail, and if it be desired to separate the product into the pigment glands, the embryo tissue and the hull tissue, the finely divided cottonseed product is first mixed with a liquid (mixture of carbon tetrachloride and a fatty acid triglyceride or a mineral oil) which does not rupture the pigment glands and which has a density less than that of the hulls and greater than that of the pigment glands and the embryo tissue. The pigment glands and embryo tissue float and the hull fragments settle. The mixture may be centrifuged in order to increase the rate of settling and pack the precipitated hulls tightly. The supernatant liquid along with the pigment glands and embryo tissue is then decanted.

The density of the decanted liquid mixture is then adjusted by the addition of a lighter organic liquid thereto (fatty acid triglyceride or mineral oil), so that the density of the resulting liquid mixture is greater than that of the pigment glands and less than that of the embryo tissue. The mixture is then thoroughly agitated and settled. The pigment glands float and the embryo tissue sinks. This mixture may also be centrifuged in order to pack the precipitated embryo tissue more tightly so that the pigment glands and supernatant liquid can more easily be decanted. The process may be repeated on either the precipitated embryo tissue or the levitated pigment glands in order to effect a further separation of pigment glands which may have adhered to particles of embryo tissue and thereby carried down with the tissue, or of embryo tissue which may have adhered to the pigment glands and thereby floated with them.

The order of separation may be altered, that is, the pigment glands may be first separated from embryo tissue and hull tissue fragments and the gland-free embryo tissue then separated from the hull fragments. The second separation can be omitted in the preparation of embryo tissue which is free of pigment glands but need not be freed of the small amount of hull fragments which usually accompany the kernels because of the inadequacy of the dehulling process normally used in preparing the seed for further treatment.

The process is applicable to any finely divided cottonseed product containing the pigments, provided only that prior treatments are not such as to rupture the pigment glands. Thus it may be applied to cottonseed which has been dehulled and flaked according to the usual method for its treatment preliminary to processing by the solvent extraction, hydraulic or continuous screw-press methods, or to cracked and ground cottonseed or to dehulled and ground cottonseed, as well as to cottonseed which has been subjected to solvent extraction of the type before mentioned.

The invention is further exhibited by the following specific examples:

*Example 1*

A sample of cottonseed was delintered, dehulled, and flaked according to the usual industrial practice. It was then defatted by means of exhaustive extraction with Skellysolve B.

A mixture of carbon tetrachloride and refined cottonseed oil of proportions to form a solution of density 1.45 g./cc. at 24.5° C. was added to a sample of the dehulled, flaked, and defatted seed. The mixture was thoroughly agitated in a Waring Blendor to disintegrate the embryo tissue and release the intact pigment glands and was then centrifuged in order to pack the precipitated hull tissue, which comprised fragments of hull tissue were not completely removed in the prior dehulling operation. The suspended pigment glands and embryo tissue were decanted with the supernatant liquid.

Refined cottonseed oil was then added to the decanted suspension until the density of the liquid mixture reached a value of 1.36 g./cc. at 24.5° C. This mixture was then centrifuged, and the pigment glands and liquid decanted from the precipitated embryo tissue. The precipitated embryo tissue was finally rinsed with Skellysolve F in order to remove all traces of adhering cottonseed oil.

Visual examination showed that the pigment-gland-free embryo tissue was of a lighter color than the original seed from which the glands had not been removed. For more accurate comparison under conditions known to produce the deepest coloration, absorption spectra of alkaline extracts of the various seed tissue being compared were determined at 20 millimicron intervals throughout the entire visible wave length range.

Such spectrophotometric examinations showed that an alkaline extract of pigment-gland-free embryo tissue was of a significantly lighter color than corresponding alkaline extracts of either the original Skellysolve B extracted cottonseed or diethyl ether extracted cottonseed.

*Example II*

In this example, the principal of mechanical separation of the seed parts was applied to another sample of the dehulled, flaked, defatted cottonseed used in the preceding example, in which the embryo tissue was freed of pigment glands, but no attempt was made to remove from the embryo tissue the small amount of hull tissue which had been carried through in the preparation of the defatted flakes.

A sample of the dehulled, flaked, defatted cottonseed was agitated with a mixture of 180 ml. of carbon tetrachloride and 70 ml. of refined cottonseed oil (density 1.402 g./cc. at 24.5° C.). Thorough agitation of the mixture was accomplished by placing it in a Waring Blendor for three minutes. The mixture was then centrifuged. After centrifugation, the pigment glands were found to be floating on the supernatant liquid surface, some of the embryo tissue was suspended in the liquid, but most of the embryo tissue and all of the hull tissue were packed at the bottom of the centrifuge tubes. The supernatant liquid, containing the pigment glands and the suspended embryo tissue, was decanted.

To this decanted mixture, refined cottonseed oil in the ratio of 1 ml. of cottonseed oil to 50 ml. of the mixture was added. Centrifugation of the new mixture caused a clean-cut separation of the remaining embryo tissue from the pigment glands, and the supernatant pigment glands and liquid were decanted from the embryo tissue which was packed at the bottom of the centrifuge tube.

The precipitates of embryo tissue and hull tissue obtained above were combined, and freed of any remaining pigment glands by resuspension in a mixture of 175 ml. carbon tetrachloride and 75 ml. refined cottonseed oil (density 1.378 g./cc. at 24.5° C.), centrifuging the mixture and decanting the supernatant pigment glands and liquid from the precipitated tissue. The precipitated tissue was rinsed two more times with Skellysolve F to remove adhering oil.

Alkaline extracts of this pigment-gland-free tissue developed very little color in contrast to a deep brown color developed by alkaline extracts of the original defatted meal from which the pigment glands had not been removed.

*Example III*

Samples of raw ground cottonseed were prepared by dehulling the seed in a Bauer mill and grinding it in a burr or Wiley mill to disintegrate the embryo tissue, and passing the ground cottonseed through an 80-mesh sieve. Some small particles of hulls remained after sieving.

Five ml. portions of a liquid having a density of 1.378 g./cc. at 24.5° C. and composed of 175 ml. of carbon tetrachloride and 75 ml. of mineral oil were added to several 0.25-gram samples of the ground cottonseed in tubes. The several tubes containing the mixtures were stoppered and agitated by rotation for 5 minutes. After the mixtures had been centrifuged for 10 minutes, the pigment glands and some very small particles of adhering embryo tissue were found to be floating at the surface, but most of the embryo tissue and all of the hull particles were packed at the bottom of the tubes.

The pigment glands were then decanted into a larger tube to which approximately 10 ml. of Skellysolve F was added. This decreased the density of the liquid sufficiently to cause the pigment glands to precipitate. The mixture was then centrifuged for 10 minutes, and after centrifugation the liquid was decanted, leaving the pigment glands and small amount of embryo tissue packed at the bottom of the tube. In order to remove all carbon tetrachloride and mineral oil from the pigment glands, the precipitate was washed three successive times with Skellysolve F.

Spectrophotometric analysis showed that chloroform and ether extracts of the separated pigment glands contained the same yellow, orange and purple pigments in the same relative amounts as did chloroform or ether extracts of the original ground seed before removal of the pigment glands.

*Example IV*

In this example, a sample of cottonseed, which had been cracked, dehulled, flaked and the oil extracted with Skellysolve B, was ground in a Wiley mill using a 2 mm. screen. Fractionation in four different trials using this ground, extracted material was varied only with respect to the time during which the materials were allowed to remain in contact with the liquid mixture used for separating the seed parts, and the temperature at which the mixture was maintained during this period of contact, details of which are included under trials A, B, C and D below.

*Trial A.*—Five hundred grams of the sample was suspended in 1500 ml. of a mixture of carbon tetrachloride and mineral oil (7:3 by volume; density at 24.5° C. 1.378 g./cc.). The suspension was shaken thoroughly and allowed to stand at 24.5° C. for twenty hours. At the end of this period, it was observed that the pigment glands were floating at the surface and that the embryo tissue and hull fragments were settled at the bottom of the liquid. The upper layer of the liquid comprising the carbon tetrachloride-mineral oil mixture and containing the pigment glands was transferred to tubes, and this mixture was centrifuged. The supernatant liquid and pigment glands were decanted from the centrifuge tubes onto filter paper on a suction funnel and the carbon tetrachloride-mineral oil mixture removed. The adhering oil was removed from the glands on the paper by washing with Skellysolve F.

The precipitated tissue was separated from the under layer liquid mixture by means of a basket head centrifuge and was washed free of adhering oil with Skellysolve F.

*Trial B* was effected by using 500 g. of the sample in a manner identical with that described in trial A, except that the whole separation was carried out at 2° C. and a mixture of carbon tetrachloride and mineral oil (2:1 by volume, density 1.38 g./cc. at 2° C.) was used in lieu of the 7:3 by volume mixture.

*Trial C* was effected by using 400 g. of the sample in a manner identical with that described in trial A, except that the suspension was allowed to stand only one and one-half hours instead of twenty hours before the supernatant pigment glands were removed.

*Trial D* was effected by using 400 g. of the sample in a manner identical with that described in trial B, except that the suspension was allowed to stand only one and one-half hours instead of twenty hours before the supernatant pigment glands were removed.

The carbon tetrachloride-mineral oil mixtures, which had been used for the separations in the four trials and after separation of the pigment glands therefrom, had very different colors. From trial A the mixture was colored cherry red, from trial B it was colored pink, from trial C it was colored very pale pink, and from trial D it was colored straw yellow. The color of the chloroform extracts of the separated pigment glands from the four trials was, however, essentially the same as that of the chloroform extract of the original cottonseed, and the colors of the alkaline extracts of the gland-free tissues were very similar, but were all significantly less than that of the corresponding alkaline extract of a sample of the original cottonseed from which the glands had not been separated.

From these observations, it can be concluded that prolonged contact with the carbon tetrachloride-mineral oil mixture causes rupture of some of the pigment glands, and that this effect is reduced at low temperatures, but that neither the temperature nor the length of contact of the liquid mixture during the separation significantly affects the color of the gland-free tissue.

Samples of 200 g. each of the gland-free tissue obtained in trials A and B were each suspended in 1500 ml. of a mixture of carbon tetrachloride and mineral oil (4:1 by volume, density at 24.5° C. 1.45 g./cc.). Within two hours, the hull tissue in each case had settled to the bottom of the flask and was so closely packed that the supernatant liquid and embryo tissue were easily decanted. The supernatant embryo tissue was separated from the liquid by means of a basket head centrifuge and was then washed free of oil by means of Skellysolve F. The precipitated hull tissue was recovered by filtration and was washed with Skellysolve F.

From the two samples, 35 and 38 g. lots, respectively, of hull fragments were recovered. Alkaline extracts of the finely ground hulls were red-brown in color. Spectrophotometric examination of these alkaline extracts showed them to be more deeply colored than corresponding alkaline extracts of the gland-free, hull-free embryo tissues.

Another sample of the gland-free tissue from trial A was suspended in a mixture of carbon tetrachloride and mineral oil (7:3 by volume, density 1.376 g./cc. at 24.5° C.), and the suspension was then cooled to −29° C., whereupon the density of the liquid mixture increased to 1.446 g./cc. After two hours, the supernatant liquid and embryo tissue were decanted from the precipitated hull tissue. Spectrophotometric examination of the alkaline extracts of the hull tissue and the hull-free, gland-free embryo tissue gave the same absorption spectra as were obtained with the corresponding extracts from the 35 and 38 g. lots above.

Example V

A 120 g. sample of dehulled and flaked cottonseed was suspended in 300 ml. of a mixture of carbon tetrachloride and mineral oil (2:1 by volume, density 1.376 g./cc. at 2° C.) in a Waring Blendor, and the sample was mixed at the full speed of the blender for one minute. This severe agitation accomplished the complete distintegration of the flakes so that the intact pigment glands were broken away from the surrounding embryo tissue. After the mixture had stood for fifteen minutes, free pigment glands floated on the surface of the liquid. The supernatant glands with some liquid and some tissue were transferred to tubes, and the suspensions were centrifuged in order to effect a cleaner separation of the glands. The supernatant glands and liquid were decanted from the centrifuge tubes onto a filter and washed with Skellysolve F in order to remove adhering oil. The precipitated tissue which remained in the blender was freed of the liquid by filtration and was washed with Skellysolve F.

Spectrophotometric examination of a chloroform extract of the separated glands showed them to contain the same yellow, orange, and purple colored pigments in the same relative proportions as when they were in the seed. Spectrophotometric comparison of alkaline extracts of the original seed and the gland-free tissue showed that removal of the glands had removed practically all of the pigments responsible for the dark color of alkaline extracts of cottonseed.

Example VI

A sample of the same dehulled and flaked cottonseed as that used in Example V was defatted by exhaustive extraction with Skellysolve F in a Soxhlet extractor. Part of this defatted seed was separated into pigment glands and embryo tissue by the same procedure as that used in Example V. Chloroform extracts of the separated pigment glands exhibited the same absorption spectra as did extracts of the original seed. The color of an alkaline extract of the pigment gland-free tissue was slightly darker than that of the corresponding extract of the pigment gland-free tissue prepared in Example V, but it was markedly lighter than that of the original defatted seed.

Example VII

A sample of a different batch of cottonseed was dehulled, flaked and then processed in a manner identical with that described in Example V. The results were similar, that is, chloroform extracts of the seed and of the separated pigment glands were of the same color; the alkaline extract of the original seed tissue was very much more deeply colored than the corresponding extract of the pigment gland-free tissue.

Example VIII

A sample of the same dehulled and flaked cottonseed as that used in Example VII was defatted as in Example VI and processed by the same procedure as that followed in Examples V and VII. Chloroform extracts of the original seed and of the separated pigment glands contained the same relative amounts of yellow, orange and purple pigments. An alkaline extract of the pigment gland-free tissue was somewhat more deeply colored than the corresponding extract of the tissue from which the glands had been separated without preliminary defatting of the seed, but it was very much less deeply colored than the corresponding extract of the original seed.

It will be understood that the mechanical separation of the seed parts by the use of organic liquids may comprise either a single separation or two separations depending on whether embryo tissue which is free only of pigment glands or free of both pigment glands and hull tissue is desired. It will also be understood that each separation can be carried out one or more times depending upon the degree of separation of the seed parts desired.

Having thus described the invention, what is claimed is:

1. A process of separating the pigment from a cottonseed product containing substantially intact pigment glands embedded in the seed embryo tissue comprising treating the product to disintegrate the embryo tissue and release the intact pigment glands, mixing the product with a liquid which does not substantially rupture the pigment glands and which has a density greater than that of the pigment glands to be separated and less than that of the remaining parts, said liquid being a mixture of carbon tetrachloride and an oil selected from the class consisting of fatty acid triglycerides and mineral oils, settling the mixture to float the pigment glands and to settle the remaining parts, and removing the pigment glands.

2. The process of claim 1, wherein the cottonseed product is cottonseed meal which has been defatted by extraction with an organic solvent which does not substantially rupture the pigment glands.

3. The process of claim 1, wherein the oil is a fatty acid triglyceride.

4. The process of claim 1, wherein the oil is a mineral oil.

5. A process of separating cottonseed meal, containing substantially intact pigment glands embedded in the seed embryo tissue and which has been defatted by extraction with an organic solvent which does not substantially rupture the pigment glands, into pigment glands, hull tissue, and embryo tissue, comprising treating the meal to disintegrate the embryo tissue and release the intact pigment glands, mixing the meal with a liquid which does not substantially rupture the pigment glands and which has a density greater than that of the pigment glands and the embryo tissue and less than that of the hull tissue, said liquid being a mixture of carbon tetrachloride and an oil selected from the class consisting of fatty acid triglycerides and mineral oils, settling the mixture to float the pigment glands and the embryo tissue and to settle the hull tissue, separating the supernatant liquid and the pigment glands and the embryo tissue from the hull tissue, adjusting the density of the separated liquid containing the pigment glands and the embryo tissue to a density greater than that of the pigment glands and less than that of the embryo tissue by adding thereto an oil selected from the class consisting of fatty acid triglycerides and mineral oils, settling the mixture to float the pigment glands and to settle the embryo tissue, and then removing the pigment glands.

CHARLOTTE H. BOATNER.
CATHERINE M. HALL.
ARTHUR L. MERRIFIELD.

REFERENCES CITED

The following references are of record in the file of this patent:

UNITED STATES PATENTS

| Number | Name | Date |
|---|---|---|
| 2,132,484 | Kober | Oct. 11, 1938 |